(No Model.)  
6 Sheets—Sheet 1.

J. G., M. O. & G. REHFUSS.
FRINGE MACHINE.

No. 581,999. Patented May 4, 1897.

Fig. 1.

WITNESSES:  
P. H. Eagle.  
L. Douville.

INVENTORS  
George Rehfuss,  
John George Rehfuss,  
Martin O. Rehfuss  
BY John A. Wiedersheim  
ATTORNEY.

THE NORRIS PETERS CO., PHOTO-LITHO., WASHINGTON, D. C.

(No Model.)

J. G., M. O. & G. REHFUSS.
FRINGE MACHINE.

No. 581,999. Patented May 4, 1897.

WITNESSES:
P. H. Nagle.
L. Douville.

INVENTORS
George Rehfuss
John George Rehfuss
BY Martin O. Rehfuss
John A. Wiedersheim
ATTORNEY.

(No Model.) 6 Sheets—Sheet 5.
J. G., M. O. & G. REHFUSS.
FRINGE MACHINE.
No. 581,999. Patented May 4, 1897.
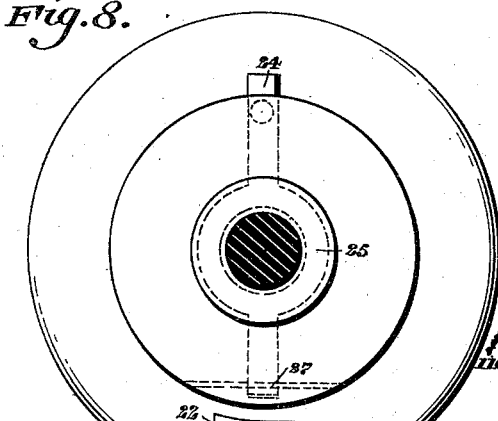
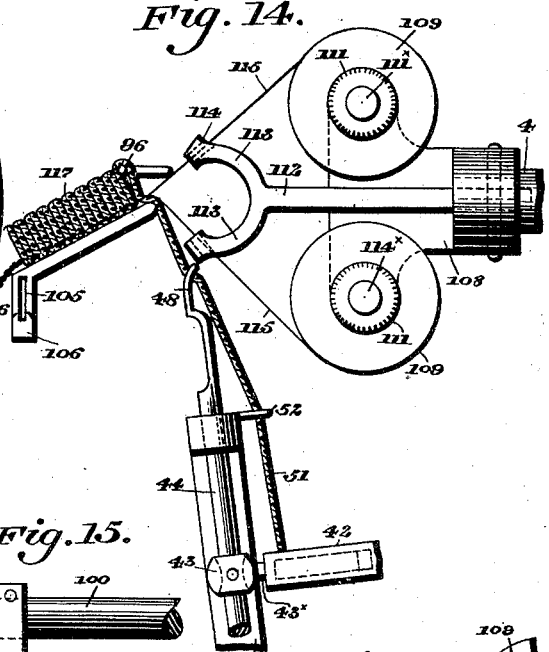
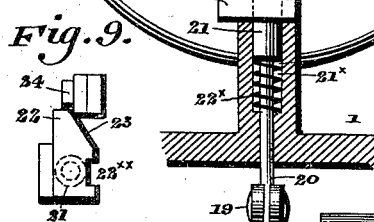
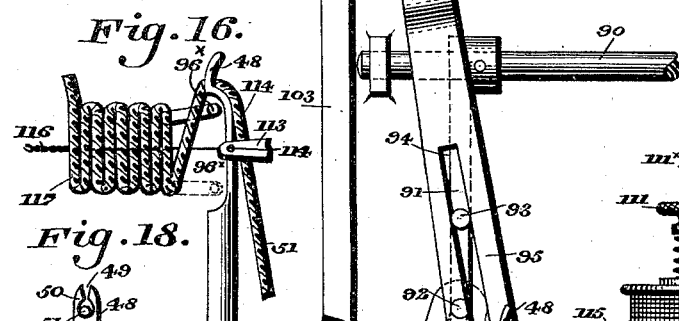
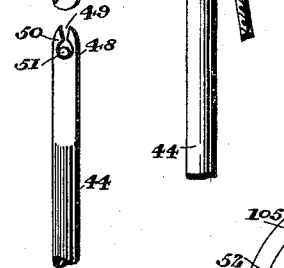
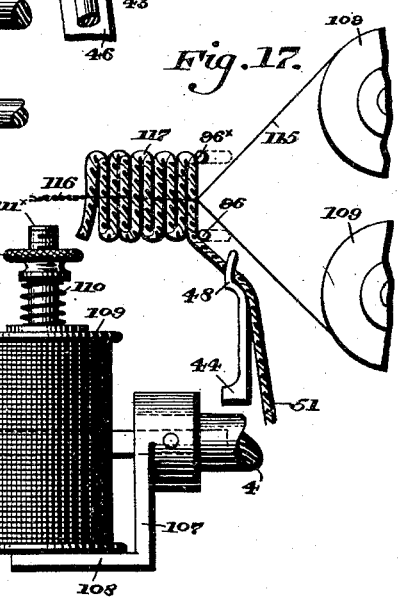
Witnesses
P. F. Nagle
L. Douville
Inventors
George Rehfuss
John George Rehfuss
By Martin O. Rehfuss
John A. Wiedersheim
Attorney (No Model.)  
J. G., M. O. & G. REHFUSS.  
FRINGE MACHINE.  
6 Sheets—Sheet 6.

No. 581,999. Patented May 4, 1897.

WITNESSES  
L. Douville,  
P. F. Aagle,

INVENTORS  
George Rehfuss.  
John G. Rehfuss.  
BY Martin O. Rehfuss.  
John A. Wiedersheim.  
ATTORNEY.

UNITED STATES PATENT OFFICE.

JOHN G. REHFUSS, MARTIN O. REHFUSS, AND GEORGE REHFUSS, OF PHILADELPHIA, PENNSYLVANIA.

FRINGE-MACHINE.

SPECIFICATION forming part of Letters Patent No. 581,999, dated May 4, 1897.

Application filed July 18, 1895. Serial No. 556,418. (No model.)

*To all whom it may concern:*

Be it known that we, JOHN G. REHFUSS, MARTIN O. REHFUSS, and GEORGE REHFUSS, citizens of the United States, residing in the city and county of Philadelphia, State of Pennsylvania, have invented a new and useful Improvement in Fringe-Machines, which improvement is fully set forth in the following specification and accompanying drawings.

Our invention consists of a novel construction of machines for making tassel-headings, &c., the same having a shaft adapted to be continuously rotated and to form twists of wire or other suitable material, which latter is unwound from spools mounted on said shaft, a thread-carrier being also suitably mounted adjacent said shaft for the purpose of forming loops, which are retained in position by said twists.

It also consists in causing the thread-carrier to make one or two movements at each revolution of the continuously-revolving shaft, whereby one or two loops are formed and retained at either or both sides of the twists at each revolution of the said shaft.

It also consists in causing a cessation of the movements of the thread-carrier at intervals, during which period the shaft carrying the wire or other suitable material continues the operation of twisting the same.

It also consists in providing means for regulating the length of the loop and the tightness of the same, provision being also made for making a greater or less number of loops in each tassel-heading or forming and retaining loops continuously.

It further consists of novel details of construction, all as will be hereinafter set forth.

Figure 2:
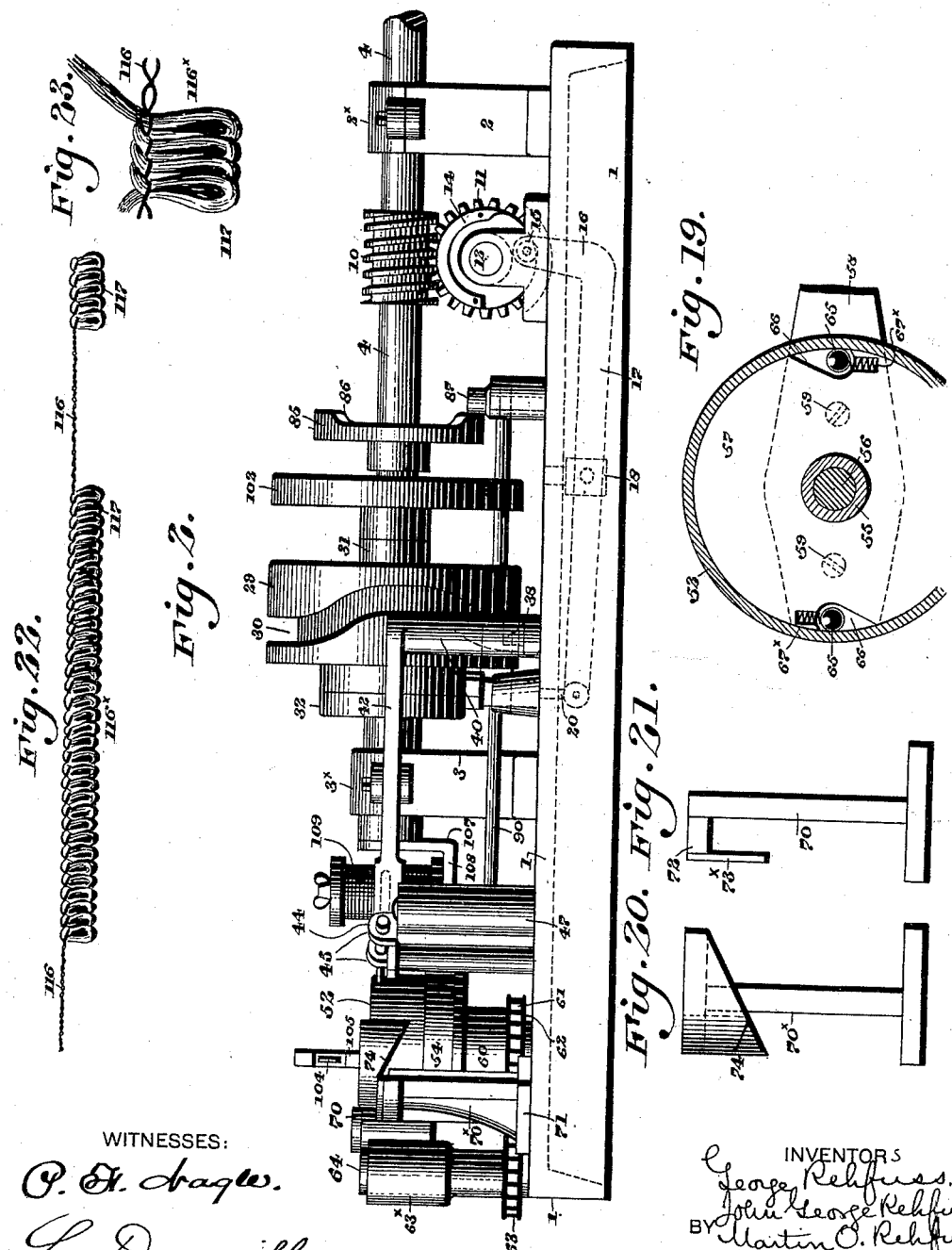
Figure 3:
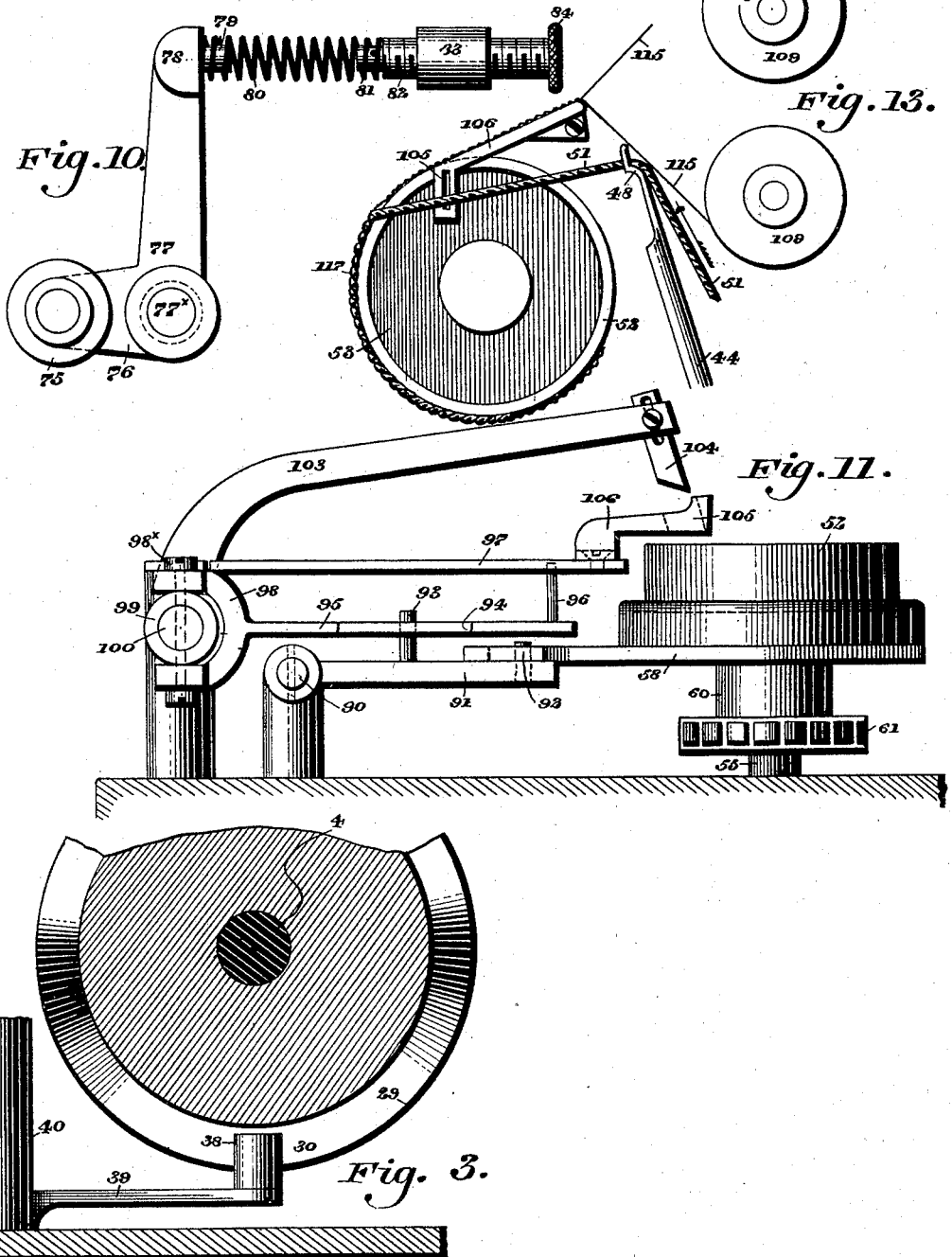
Figure 4:
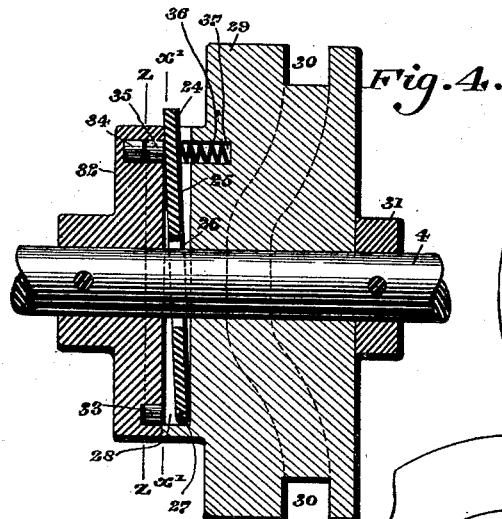
Figure 5:
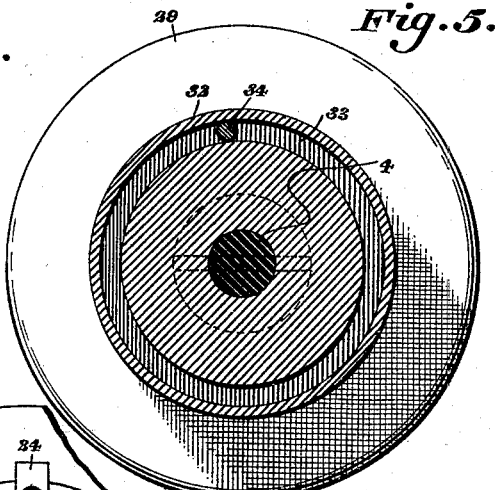
Figure 6:
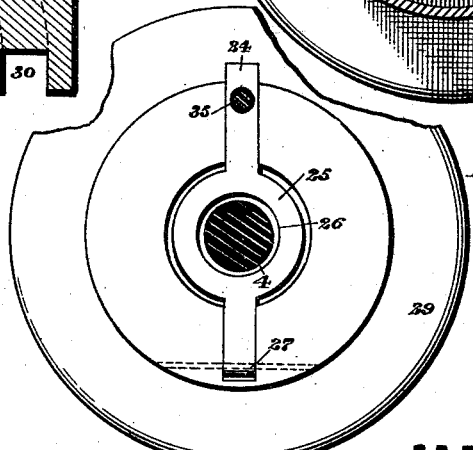
Figure 7:
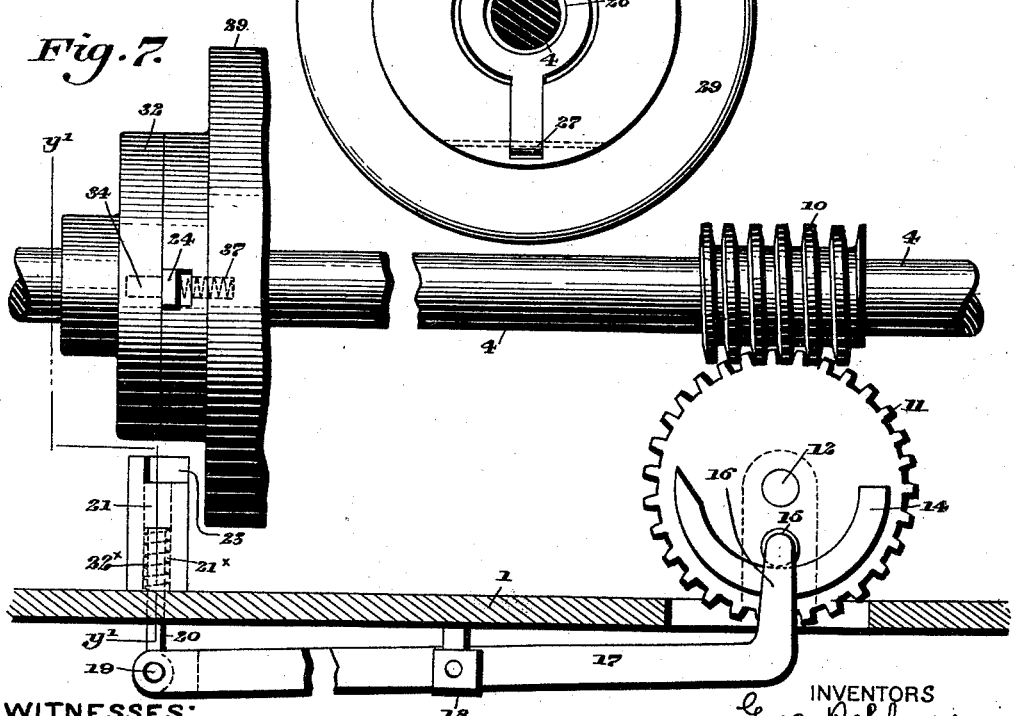
Figure 12:
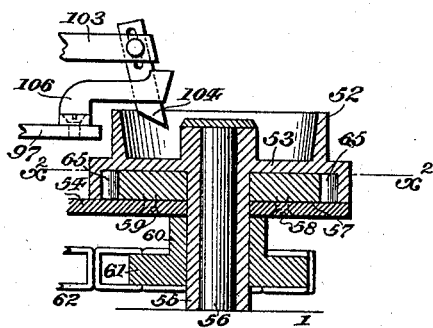

Figure 1 represents a plan view of a tassel-heading machine embodying our invention. Fig. 2 represents a side elevation of the same. Fig. 3 represents a section in line $x\ x$, Fig. 1, showing the relation of a portion of the actuating mechanism to one of the cams. Fig. 4 represents a partial section on line $y\ y$, Fig. 1, the parts being revolved from the position seen in said figure. Fig. 5 represents a vertical section on line $z\ z$, Fig. 4. Fig. 6 represents a vertical section on line $x'\ x'$, Fig. 4. Fig. 7 represents a side elevation of a portion of the mechanism seen in Fig. 2, the same being revolved from the position seen in said figure. Fig. 8 represents a section on line $y'\ y'$, Fig. 7. Fig. 9 represents a detailed view showing portions of the clutch mechanism about to contact. Fig. 10 represents a detailed view showing the manner of adjusting the tension of one of the feed-rolls. Fig. 11 represents an end elevation of a portion of Fig. 1, showing the means for actuating the cutter and certain other portions of the machine. Fig. 12 represents a vertical section through Fig. 11, showing the means for actuating the drum and the cutting device in a different position. Fig. 13 represents a detail plan view of the drum and wire-carrying spools, showing the manner in which the thread is fed prior to cutting. Fig. 14 represents the positions the spool-carrier, thread-carrier, and their adjuncts assume primarily in forming the tassel-head. Fig. 15 represents the position the same elements and their adjuncts assume at another period during the formation of the tassel-head. Figs. 16 and 17 represent detail views showing the position the spool-carrier, thread-carrier, and their adjuncts assume in another embodiment of our invention in which two pins are employed. Fig. 18 represents a plan view of the thread-carrier employed. Fig. 19 represents a horizontal section on line $x^2\ x^2$, Fig. 12, showing a portion of the actuating device for the drum. Figs. 20 and 21 represent front and side elevations of a suitable guiding device to be hereinafter referred to. Fig. 22 represents a side elevation of the finished product. Fig. 23 represents a similar view of the same on an enlarged scale.

Similar numerals of reference indicate corresponding parts in the several figures.

Referring to the drawings, 1 designates the bed of the machine, the same being provided with the upright posts 2 and 3, in the upper portion of which are the bearings $2^\times$ and $3^\times$ for the shaft 4, which has mounted thereon the hand-wheel 5 and the belt-pulley 6, which is connected with the shaft by suitable clutch mechanism, which latter is thrown into and out of operation by means of the collar 7, the construction of said clutch mechanism being not shown in detail, since it forms no part of the present invention, the same being thrown into and out of operation by means of the lever 8, which is fulcrumed at the point 9 and has a pin or projection engaging an annular groove in the collar 7, whereby the movement of the handle in either direction will cause a corresponding movement of said collar and will throw the mechanism into and out of operation, as will be evident.

10 designates a worm mounted upon the shaft 4, which worm meshes with and actuates the gear-wheel 11, which is mounted on the shaft 12, the latter being supported in suitable bearings 13.

14 designates a cam which is attached to said gear 11, the contour of said cam being understood from Figs. 2 and 7, it being of course understood that said cam may be a separate disk mounted on the shaft 12, which can be readily removed and replaced, different-sized cams being used, according to requirements.

15 designates a roller mounted upon the arm 16 of the lever 17, which is fulcrumed at 18, the other end of said lever having pivotally attached thereto the rod 20, which passes up through the bed 1, as will be understood from Figs. 7 and 8, and has a head 21, which is movable in the cavity $21^\times$, the proper position of said parts being always assured by means of the spring $22^\times$, which has one end abutting against the bottom of said cavity, while the other end is in contact with the under side of the head 21.

22 designates a dog mounted upon said head 21, which is provided with an inclined face 23 and a recessed portion $22^{\times\times}$, said dog being adapted to contact at intervals with the extremity 24 of the plate 25, which is best seen in Figs. 4 and 6, said plate having an opening 26 therein, through which the shaft 4 freely passes, while its lower end is pivoted at 27 within the cavity 28 of the cam-wheel 29, which is provided with a cam-groove 30, said cam-wheel revolving freely on the shaft 4 and being held in position thereupon by means of the collar 31 and the disk 32, which has therein the annular groove 33, in which is secured a pin or stop 34, which projects substantially to the face of that portion of the disk 32 which is in contact with the cam-wheel 29.

35 designates a pin which is mounted upon the plate 25 and is adapted to engage said pin 35 at proper intervals, as will be hereinafter explained, said plate 25 being held in its forward position normally, as shown in Fig. 4, by means of a spring 36, which is seated in a suitable cavity 37.

38 designates a roller mounted upon an arm 39 of the elbow-lever 40, which is fulcrumed at 41 and has another arm 42, which is provided with a cavity in the end thereof, into which projects the cylindrical or other-shaped stem $43^\times$ of the head 43, which is attached to the thread-carrier 44, which reciprocates freely in the lugs or guides 45, mounted on the lever 46, which is fulcrumed to a suitable fixed point 47, it being understood that in practice the arms 39 and 42 are made adjustable relative to each other and held in position by means of the adjusting-screw located at the point 41, said screw being loosened when adjustment is desired and afterward tightened up when the adjustment is completed.

48 designates the extremity of said thread-carrier, the same being slightly curved when viewed from its side and provided with a wedge-shaped recess 49, which terminates in an eye 50, through which the thread 51 passes, as will be hereinafter explained, it being of course evident that the recess 49 might be at the side as well as at the end of said carrier 48.

52 designates a drum which has a base portion or partition 53, from which depends the annular flange 54.

55 designates a hollow sleeve which depends from said partition 53 and engages the post 56, upon which said drum is adapted to rotate.

57 designates a disk which is held in position adjacent the flange 54 and the partition 53 of the drum by means of the lever or bar 58, which is attached thereto by the screws or similar devices 59.

60 designates a neck separate from said bar 58 and secured to sleeve 55, to which neck is attached a sprocket-wheel 61, around which passes the sprocket-chain 62, which engages a second sprocket-wheel 63, (best seen in Figs. 1 and 2,) upon which latter sprocket-wheel is mounted a feed-roll $63^\times$, the latter and said wheel being rotatable upon the post 64.

65 designates rollers or cylindrical blocks which are mounted within the cavity 66 of the disk 57, said rollers being in contact with springs $67^\times$, which point in opposite directions, as will be understood from Fig. 19, whereby it will be apparent that a slight oscillation of the bar 58 will, by reason of its attachment to the disk 57 and the reversely-inclined recesses therein, having the rollers and springs arranged as described, cause a movement of the drum, this movement being caused by the contact of the rollers 65 with the flanges 54 and the walls of the recesses 66 in the disk 57, the drum being thus rotated in a jerking manner simultaneously with the sprocket-wheel 61, as is evident.

70 designates a stand which has a foot 71, adapted to be attached to the bed 1, which has a suitable body $70^\times$ rising therefrom.

72 designates a laterally-extending portion from which depends the portion 73, which is provided with an inclined bottom edge 74, the face $73^\times$ of said stand being adapted to be in substantial contact with the drum 52, the relative position of said stand and drum being understood from Figs. 1 and 2, the inclined edge 74 having the function of directing the product downwardly from the drum, as will be made apparent.

75 designates a feed-roll which is adapted to contact with the roll $63^\times$, said roll 75 being mounted upon the arm 76 of the elbow-lever 77, which is fulcrumed at the point 77×, the other limb 78 of said elbow-lever having a projection 79 thereon, as best seen in Figs. 1 and 10, which is adapted to be engaged by the end of the spring 80, the other end of the latter being in contact with the end 81 of the threaded screw 82, which passes through the bearing or stand 83 and is provided with a head 84, whereby it will be seen that upon screwing said head 84 in or out of said stand the tension of the spring will be varied, and consequently the degree of contact between the feed-rolls 75 and 63×.

85 designates a cam-disk mounted upon the shaft 4, which is provided with a working face 86, which is adapted to contact with and actuate the end 87 of the lever 88, which is fulcrumed at 89, the other end of said lever 88 being pivotally attached to the rod 90, whereby it will be seen that a longitudinal or reciprocating movement will be imparted to said rod 90, as will be best understood from Figs. 1 and 15.

91 designates an arm rigidly attached to said rod 90, said arm having a pin-and-slot connection at 92 to an end of the bar or lever 58, which is attached to the disk 57, as will be understood from Fig. 12.

93 designates a pin which projects upwardly from said arm 91 and engages the walls of the slot 94 in the bar 95, which latter has mounted in the end thereof a pin 96, the relative location and arrangement of parts being understood from Figs. 11 and 15.

97 designates a plate which is provided with a suitable slot 97×, through which said pin 96 is adapted to project at intervals.

98 designates a fork or yoke which is attached to said bar 95 and is pivotally mounted on the collar 99 by means of the pin 98×, said collar 99 being mounted upon the rock-shaft 100, which is mounted in suitable bearings and is caused to rock at the proper intervals by means of the arm 101, which has a roller 101× mounted thereon, so as to engage a suitable cam-groove in the disk 102, mounted on the shaft 4, as will be understood from Fig. 1, whereupon it will be seen that the rocking of said rod 100 will give an up-and-down movement to the bar 95 and also to the pin 96, while the reciprocation of the rod 90 will at the same time, through the medium of the pin 93 engaging the walls of the slot 94, impart a reciprocating movement to said bar 95, the latter and the pin 96 attached thereto being thus capable of an up-and-down as well as a forward-and-backward movement, the object and function of which will be hereinafter set forth.

103 designates an arm having one end attached to said rod 100, while its other end terminates adjacent the drum 52 and has mounted in said latter end the blade or shear 104, which is adjustably secured thereto.

105 designates a hole or slot in the arm 106, through which said blade 104 is adapted to pass so as to cut the thread 51 at the proper intervals, as will be explained, said thread crossing the slot 105 at certain times in the manner indicated in Fig. 13.

107 designates an angular-shaped plate which is attached to the end of the shaft 4, as best seen in Fig. 15, said plate having a shelf 108, the whole forming a spool-carrier, upon which are supported the spools 109, which in the present instance are two in number, said spools being rotatable and held in position by means of the spring 110, the tension of which can be varied according to requirements by manipulating the thumb-nuts 111, which engage the threaded studs 111×, on which latter said spools revolve.

112 designates a rod which projects forwardly from the extremity of said shaft 4 and rotates in unison therewith and also with the spools 109, said rod being forked at its extremity and having the prongs 113, in which are the eyes 114, through which the wire 115 passes as the same unwinds from the spools 109, the simultaneous unwinding and rotation of the spools forming the straight twisted portion 116 of the finished tasseling-head 116×, (seen in Figs. 22 and 23,) while the thread 51 is, by means of the reciprocation of the thread-carrier 44 and the movement of the pin 96 at the proper intervals, caused to assume the shape of loops 117, which are engaged by the said wire, as will be hereinafter explained.

If desired, instead of one pin 96 two pins 96× may be employed, the same being suitably attached to the bar 95, as will be readily understood from Figs. 16 and 17, the manner of forming the loops and the relation of the twisted wires thereto being readily understood from said figures.

The operation is as follows: The rotation of the shaft 4, through the medium of the cam-disk 102 and the intermediate connections, causes a rocking or up-and-down movement to be imparted to the shaft 100, and thence to the arm 103, and also to the plate 95 and the pin 96. The rotation of the cam-disk 85 causes a reciprocating movement to be imparted to the rod 90, and by reason of the arm 91 and the pin 93 the bar 95 is also caused to oscillate on the pivot 98×, said bar and pin thus having an up-and-down as well as a backward-and-forward movement, as has been stated. The bar 58 because of its pivotal connection with the arm 91 is enabled to rock upon its support, and by reason of its attachment to the disk 57 in the manner described and the action of the spring 67 and the contact of the rollers 65 with the disk 57 and flange 64 the said drum is caused to revolve in a jerky manner, at the same time revolving the sprocket-wheel 61, thereby imparting rotation to the feed-roller 63×, as is evident. The rotation of the cam-wheel 29 will cause the elbow-lever 40 to rock upon its fulcrum 41, thereby imparting to the thread-carrier 44, through the intermediate connections, a reciprocating movement, thus causing the same to advance in between the prongs 113 at the proper intervals, as will be hereinafter explained, the lever 46 moving on its fulcrum 47, as is evident.

To operate the machine, the thread 51 is first passed through a suitable tension device, as 52$^\times$, which may be mounted on the arm 46, and thence through the eye 50 of the thread-carrier 44, as seen in Fig. 18, and thence between the feed-rolls 63$^\times$ and 75. The wire is then unwound a short distance upon the spools 109 and is passed through each of the eyes 114, as will be understood from Figs. 1 and 14, the wires then being caught together and also carried around the drum through and between the friction or feed rollers 63$^\times$ and 75. First, assume the parts to be in the position seen in Fig. 14, the thread-carrier moves forward, the shaft 4 having previously rotated sufficiently from the position seen in said Fig. 14 to allow said thread-carrier and thread to advance between the two converging wires 115 into the position seen in Fig. 15. The pin 96 now rises and moves forward, or to the left of the position seen in Fig. 15, into the position seen in Fig. 14, the wire twisting in the meanwhile, so as to hold each portion of the looped thread in the proper position relative to the adjacent loop, as will be understood from Fig. 23. The pin 96 now drops from the position seen in Fig. 14 below the plate 97, which is omitted from said Fig. 14 for the sake of clearness of illustration, and moves back, or to the right, into the position seen in Fig. 15 again, at which point it rises so as to engage the thread 51 again, after which the thread-carrier moves back, the above operations being successively repeated so long as the working face of the cam 14, which operates the lever 17, is in contact with the roller 15, as seen in Fig. 7. As soon as said roller leaves the working face of said cam the spring 22$^\times$ (best seen in Figs. 7 and 8) causes the trip or portion 22 of the clutch to fly up and engage the end 24 of the plate 25, as will be understood from Fig. 9, the pins 35 and 34 being then moved out of contact, and the rotation of the cam-wheel 29, and consequently the movement of the thread-carrier, ceases momentarily, said thread-carrier being now in the position seen in Fig. 14. The shaft 4 continues to rotate, and the wire is thus continuously unwound and twisted, since the feed-rolls are continuously rotating, thereby causing the thread 51 also to be continuously fed in the direction of the arrow in Fig. 13, said thread eventually being caused to cross the slot 105, as seen in Fig. 13, at which point it is severed by the descent of the blade 104, as will be understood from Figs. 13, 11, and 12, the finished product appearing substantially as seen in Fig. 22, while its manner of formation is as seen in Fig. 23, as has been stated. The inclined face 74 of the stand 70 (best seen in Fig. 20) causes the finished product to properly wind about the drum 52.

It will be seen from the foregoing that the length of the loops can be increased or decreased, as desired, by adjusting the movement of the thread-carrier and also the movement of the pin which takes the loops from said thread-carrier.

The number of the thread-loops in the finished product can be increased or diminished by cutting out the cam-plate 14 to a greater or less extent or by making the same adjustable, (not shown,) so as to stop the cam-clutch sooner or later by the engaging lever 17.

The finished product may be made tighter or looser, which is accomplished by making more or less loops therein, the same being adjustable by the regulation of the feed, as is evident.

Having thus described our invention, what we claim as new, and desire to secure by Letters Patent, is—

1. In a machine of the character described, a spool-carrier adapted to sustain spools of wire, a shaft for supporting said carrier, and means for continuously rotating said shaft in combination with means for causing a thread to assume the position of loops into which said wire is continuously inserted and twisted.

2. In a machine of the character described, a pin suitably supported, means for imparting to the same an up-and-down, and forward-and-backward movement, a thread-carrier, means for reciprocating the same, a spool-carrier adapted to support spools of wire, means for continuously rotating said spool-carrier.

3. In a machine of the character described, a pin suitably supported, and means for imparting to the same an up-and-down, and forward-and-backward movement, a drum, feed-rolls adjacent the latter, a thread-carrier, means for reciprocating the same, a spool-carrier adapted to support spools of wire, a fork adjacent said spools, means for continuously rotating said spool-carrier and fork, and means for actuating said pin, thread-carrier feed-rolls and drum in unison.

4. In a machine of the character described, a pin and means for imparting to the same an up-and-down, and forward-and-backward movement, a thread-carrier, means for reciprocating the same, a spool-carrier adapted to support spools of wire thereupon, and to be continuously rotated, a fork mounted on said spool-carrier, a rotatable drum, means for rotating the same at intervals, a cutter mounted adjacent said drum, feed-rolls suitably supported and means for varying the tension of said feed-rolls.

5. In a machine of the character described, the rods 90 and 100, means for imparting a reciprocating and a rocking motion respectively thereto, an arm 91 having a pin 93 thereon, a bar 95 having a forked end pivotally attached to a suitable portion of said rod 100, a slot in said bar engaged by said pin 93, a lever 58 pivotally attached to said arm 91, a disk 57 to which said lever is attached, a drum 52 having rollers 65 common to it and to the disk, recesses in the latter for said rollers, springs for holding the latter in position, means for actuating said drum, feed-rollers mounted adjacent to the latter, a thread-carrier, a spool-carrier, a cutter, and means for actuating the above parts in unison.

6. In a machine of the character described, a device for looping threads, means for continuously feeding and twisting a wire between the loops of said thread, and means for momentarily stopping the action of the looping device without stopping the action of the wire feeding and twisting device, in combination with means for cutting said thread at proper intervals without necessitating the stopping of the machine.

7. In a machine of the character described, a spool-carrier adapted to sustain spools of wire, means for continuously rotating the same, a guide for said wire, a rotatable drum, means for actuating the latter, feed-rollers adjacent said drum, a pin suitably supported adjacent said drum, means for giving to said pin an up-and-down and forward-and-backward movement, a thread-carrier and means for actuating the same.

8. In a machine of the character described, the shaft 4 adapted to be continuously rotated, the cam-wheel 29 freely rotatable thereon, the spring-pressed plate 24, having a projection thereon and pivoted to said wheel, a disk having a groove and a pin therein attached to said shaft adjacent said wheel, means for moving said plate toward or away from said disk at proper intervals, a shaft 100 having an arm provided with a cutter attached thereto, means for rocking said shaft, a rotatable drum, means for actuating the same, feed-rolls, means for actuating said drum and feed-rolls, means for looping a thread, and means for continuously feeding and twisting wire therebetween.

9. In a machine of the character described, means for intermittently looping a thread, and means for continuously feeding and twisting a wire therebetween, in combination with suitable devices for cutting off said thread at proper intervals.

10. In a machine of the character described, a shaft adapted to be revolved continuously, a spool-carrier mounted upon said shaft, and adapted to support wire or similar material and means for causing said wire to simultaneously unwind and twist in combination with a thread-carrier adapted to form loops which are retained by the twists of said wire.

11. In a machine of the character described, a shaft adapted to be revolved continuously, a spool-carrier adapted to sustain spools of wire supported upon said shaft, means for unwinding and twisting said wire, and a thread-carrier in combination with means for causing said thread-carrier to make a plurality of movements during each revolution of said shaft, thereby forming and retaining a plurality of loops at either or both sides of the twists formed at each revolution of said shaft.

12. In a machine of the character described, a thread-carrier, a shaft adapted to be rotated continuously, supports for spools of wire or other material mounted on said shaft, and means for unwinding and twisting said wire in combination with means for temporarily stopping the movement of the thread-carrier, without stopping the rotation of the said shaft.

13. In a machine of the character described, means for regulating the length of the loops and the tightness of the same, in combination with means for making a greater or less number of loops in each tassel-heading.

14. In a machine of the character described, the combination of means for intermittently looping a thread, with mechanism for continuously feeding and twisting a wire between the loops of said thread.

JOHN G. REHFUSS.
MARTIN O. REHFUSS.
GEORGE REHFUSS.

Witnesses:
JOHN A. WIEDERSHEIM,
E. HAYWARD FAIRBANKS.